United States Patent
An et al.

(10) Patent No.: US 8,618,005 B2
(45) Date of Patent: Dec. 31, 2013

(54) GLASS POWDER AND METHOD OF MANUFACTURING THE SAME

(75) Inventors: Sungyong An, Gyeonggi-do (KR); Jeongwook Kim, Busan (KR); Sungbum Sohn, Gyeonggi-do (KR); Jinwoo Hahn, Gyeonggi-do (KR); Soonmo Song, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 206 days.

(21) Appl. No.: 13/103,685

(22) Filed: May 9, 2011

(65) Prior Publication Data

US 2012/0183773 A1    Jul. 19, 2012

(30) Foreign Application Priority Data

Jan. 18, 2011  (KR) .......................... 10-2011-0004999

(51) Int. Cl.
  *C03C 8/02*  (2006.01)
  *C03C 3/089*  (2006.01)

(52) U.S. Cl.
  USPC ............... 501/21; 501/12; 501/134; 501/139; 501/65

(58) Field of Classification Search
  USPC .......................... 501/12, 14, 21, 134–139, 65
  See application file for complete search history.

(56) References Cited

U.S. PATENT DOCUMENTS

| | | | | |
|---|---|---|---|---|
| 7,605,104 B2* | 10/2009 | Sohn et al. | ..................... | 501/138 |
| 7,691,762 B2* | 4/2010 | Sohn et al. | ..................... | 501/21 |
| 7,851,393 B2* | 12/2010 | Sohn et al. | ..................... | 501/65 |
| 8,270,144 B2* | 9/2012 | Sohn et al. | ..................... | 361/313 |
| 2007/0027020 A1* | 2/2007 | Sohn et al. | ..................... | 501/65 |
| 2010/0069222 A1* | 3/2010 | Sohn et al. | ..................... | 501/65 |
| 2010/0165542 A1* | 7/2010 | Sohn et al. | ..................... | 361/313 |
| 2012/0138215 A1* | 6/2012 | Kim et al. | ..................... | 156/182 |

FOREIGN PATENT DOCUMENTS

| | | |
|---|---|---|
| JP | 2010-132462 | 6/2010 |
| KR | 10-0813601 | 3/2008 |

\* cited by examiner

*Primary Examiner* — Karl Group
(74) *Attorney, Agent, or Firm* — McDermott Will & Emery LLP

(57) ABSTRACT

Provided are a glass powder represented as $aLi_2O\text{-}bK_2O\text{-}cBaO\text{-}dB_2O_3\text{-}eSiO_2$ wherein $a+b+c+d+e=1$, and $0.01 \leq a \leq 0.1$, $0.01 \leq b \leq 0.1$, $0.01 \leq c \leq 0.1$, $0.05 \leq d \leq 0.3$, and $0.3 \leq e \leq 0.7$ are satisfied in terms of mol %, a method of manufacturing the same, and a multi-layered ceramic material using the same. Therefore, a nano glass powder having an average particle size of 100nm or less and uniform particle size distribution can be manufactured using liquid phase deposition, specifically, a sol-gel method. In addition, the glass powder can be used as sintering additives to decrease a sintering temperature by about 100° C. in comparison with conventional glass upon manufacture of a ceramic material such as MLCC and MLCI, which can be sintered at a low temperature, contributing to improvement of dielectric capacity and inductance capacity of the parts and increasing quality coefficient.

1 Claim, 3 Drawing Sheets

- PRIOR ART -

GLASS POWDER AND METHOD OF MANUFACTURING THE SAME

CROSS-REFERENCE TO RELATED APPLICATIONS

This application claims the benefit of Korean Patent Application No. 10-2011-0004999 filed with the Korea Intellectual Property Office on Jan. 18, 2011, the disclosure of which is incorporated herein by reference.

BACKGROUND OF THE INVENTION

1. Field of the Invention

The present invention relates to a glass powder used in a multi-layered ceramic material and a method of manufacturing the same.

2. Description of the Related Art

In recent times, as mobile telecommunication markets including mobile phones grown, demands of ceramics are being increased as materials for electronic circuit board or multi-layered ceramic electronic parts. As a high conductivity material having a low melting point such as Ag, Cu, etc., is used for internal interconnection circuits, products formed of a ceramic material that can be formed through low-temperature plasticization are also needed.

$BaTiO_3$, $Ba(Ca)TiO_3$, $BaTi_4O_9$, etc., are used as a dielectric material for a multi-layered ceramic capacitor (MLCC), and NiZnCu ferrite is used for a multi-layered chip inductor.

Now, a glass powder formed of five elements or more is generally manufactured through a melt-quenching method, and the manufactured powder has a size of micrometer and non-uniform particle size distribution.

The glass powder manufactured through the melt-quenching method is used as sintering additives, and applied to chip ceramic parts. However, since the particle size cannot be reduced to 0.5μm or less, a large number of layers cannot be substantially stacked as a thin film sheet. In addition, when a method of forming a sheet is applied, since dispersion of the sheet is deteriorated, a forming sheet cannot be easily manufactured.

When the particle size of the glass powder can be maximally reduced and the glass powder can be formed in a substantially spherical shape, since glass powder can be easily dispersed and has a lower melting point that that of the glass powder having a large particle size, it is more advantageous to a low temperature plasticization.

Meanwhile, the conventional technique of manufacturing a glass powder using the melt-quenching method is as shown in FIG. 1, and, will be described with reference to FIG. 1 as follows. First, raw glass materials are prepared and then weighted, melted at about 1200° C. or more, and then, abruptly cooled. The abruptly cooled materials are crushed through milling to obtain the resultant glass powder. However, the crushing method using milling cannot easily crush the powder to a particle size of about 0.5μm or less, and thus, the powder has a non-uniform particle distribution.

SUMMARY OF THE INVENTION

The present invention has been invented in order to overcome the above-described problems and it is, therefore, an object of the present invention to provide a glass powder having an average particle size of nanometer and uniform particle distribution.

It is another object of the present invention to provide a method of manufacturing a glass powder.

It is still another object of the present invention to provide a multi-layered ceramic material than can be plasticized at a low temperature using the glass powder.

In accordance with one aspect of the present invention to achieve the object, there is provided a glass powder represented as the following Formula 1:

$$aLi_2O\text{-}bK_2O\text{-}cBaO\text{-}dB_2O_3\text{-}eSiO_2 \qquad \text{Formula 1}$$

wherein a+b+c+d+e=1, and 0.01≤a≤0.1, 0.01≤b≤0.1, 0.01≤c≤0.1, 0.05≤d≤0.3, and 0.3≤e≤0.7 are satisfied in terms of mol %.

The glass powder may have a particle size of 10 to 100nm.

In accordance with another aspect of the present invention to achieve the object, there is provided a method of manufacturing a glass powder comprising: dissolving starting materials of Li, K, Ba and B in a solvent; additionally inputting a starting material of Si to react the starting materials; manufacturing a solution having an adjusted pH in a separate vessel; and adding the reacted solution to the pH-adjusted solution to manufacture a nano glass.

The glass powder may be manufactured through a sol-gel method.

The starting materials of Li and K may be at least one salt selected from the group consisting of hydroxide, acetate, nitrate, chloride, alkoxide, oxide, and carbonate.

The starting material of Ba may be at least one salt selected from the group consisting of acetate, chloride, hydroxide octahydrate, and nitrate.

The starting material of B may be boric acid or trimethyl borate.

The starting material of Si may be tetraethyl orthosilicate (TEOS).

The method according to claim 3, wherein the pH is 3 to 13.

The solvent may be at least one selected from the group consisting of distilled water, acidic solvent, and alcohols.

The the distilled water, acidic solvent and alcohols may be mixed at a ratio of 0.7:0.0:0.5 to 1.3:0.2:1.3.

The pH-adjusted solvent may include an alcohol-based solvent and a basic catalyst.

The basic catalyst may be at least one selected from the group consisting of ammonia and urea.

A mixing ratio of the alcohol-based solvent and basic catalyst may be a volume ratio of 10:1 to 1:1.

In accordance with still another aspect of the present invention to achieve the object, there is provided a ceramic material that can be plasticized at a low temperature using the glass powder.

The plasticization may be performed at a temperature of 1100 to 1200° C.

The glass powder may be used as sintering additives.

The ceramic material may be at least one selected from the group consisting of a multi-layered ceramic capacitor and a multi-layered chip inductor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
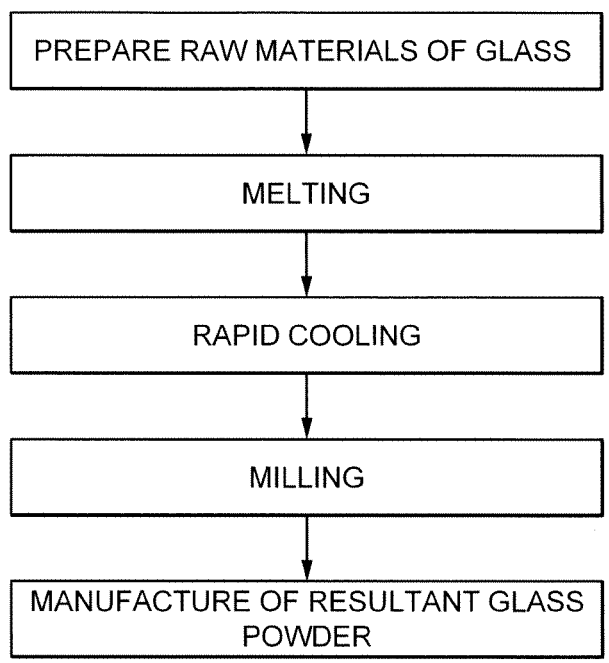
FIG. 1 is a flowchart showing a process of manufacturing a glass powder using a conventional melt-quenching method.

Hereinafter, the present invention will be described in detail.

The terms used throughout this specification are provided to describe embodiments but not intended to limit the present invention. In this specification, a singular form includes a plural form unless the context specifically mentions. When an element is referred to as "comprises" and/or "comprising", it does not preclude another shape, number, step, operation, member, component and/or group thereof, but may further include the other shape, number, step, operation, member, component and/or group thereof unless the context clearly indicates otherwise.

The present invention provides a glass powder having an average particle size of 10 to 100 nm at a low temperature and uniform particle size distribution using liquid phase deposition, specifically a sol-gel method and a method of manufacturing the same, rather than a conventional method of manufacturing a glass powder using a melt-quenching method.

A nano glass powder in accordance with the present invention is five-element composition represented as the following Formula 1.

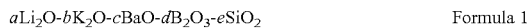

$aLi_2O\text{-}bK_2O\text{-}cBaO\text{-}dB_2O_3\text{-}eSiO_2$   Formula 1

Here, a+b+c+d+e=1, and $0.01 \leq a \leq 0.1$, $0.01 \leq b \leq 0.1$, $0.01 \leq c \leq 0.1$, $0.05 \leq d \leq 0.3$, and $0.3 \leq e \leq 0.7$ are satisfied in terms of mol %.

In the glass powder of Formula 1, Li metal, which is a glass network-modifier, cuts a glass network formed of silicon (Si) metal or boron (B) to decrease a glass melting point and improve high temperature fluidity. Accordingly, the content is in a range from 0.01 to 0.1 mol % with respect to an oxide in the entire glass composition. When the content is less than 0.01 mol %, high temperature fluidity of the glass is decreased, and a liquid phase formation temperature may be excessively increased. When the content is more than 0.1 mol %, a structure of the glass may be weakened and crystallization may occur to make it difficult to form the glass.

In addition, in the glass powder of Formula 1, barium (Ba) metal functions to adjust a melting point of glass, which is an element capable of maximally reducing the melting point of the glass. In particular, Ba metal functions to gently vary high-temperature viscosity of the glass to prevent abrupt sintering contraction. When the content is more than 0.1 mol %, sintering property may be decreased.

Further, in the glass powder of Formula 1, similar to Li, potassium (K) metal, which is also a glass network-modifier, functions to cut a glass network formed of Si or B to decrease a glass melting point and improve high-temperature fluidity. Accordingly, the content may be within a range from 0.01 to 0.1 mol % with respect to an oxide of the entire glass composition. In particular, when K is input with another alkali oxide such as Li, K generates a chemically complementary effect to increase chemical durability of the glass and reduce dielectric loss of a dielectric material. When the content is within a range from 0.01 to 0.1 mol %, the glass may have appropriate high-temperature fluidity and appropriate complementary effect with Li.

Furthermore, in the glass powder of Formula 1, B metal functions as a glass network-former with Si, which is a major factor for determining solubility with respect to a ceramic mother material. Moreover, B, which is a solvent, functions to largely decrease a melting point of the glass and largely increase high-temperature fluidity. In particular, in order to improve high-temperature fluidity, B may be added to a content of 0.05 mol % into the glass composition. However, when the content of B is more than 0.3 mol %, the glass may be structurally weakened to decrease chemical durability, and crystallization of the glass may cause decrease in glass formability.

In addition, in the glass powder of Formula 1, Si metal functions as a glass network-former, which is operated as a most important factor for determining high-temperature fluidity and melting point of the glass and solubility to the ceramic mother material. Si may be within a range from 0.3 to 0.7 mol % with respect to an oxide in the entire glass composition. When the content is less than 0.3 mol %, solubility to the ceramic material may be decreased not to improve low-temperature sintering property, and when more than 0.7 mol %, since high-temperature fluidity is decreased and liquid phase formation temperature is increased, Si is not appropriate as low-temperature sintering additives.

The method of manufacturing the glass powder represented as Formula 1 includes dissolving starting materials of Li, K, Ba and B in solvents, additionally inputting a silicon starting material into the resultant solution to perform a reaction, manufacturing a solution having an adjusted pH in a separate vessel, and adding the reacted solution into the adjusted pH solution to manufacturing a glass powder.

Starting materials of Li and K metals, among the starting materials, are not limited, but may use at least one salt selected from the group consisting of hydroxide, acetate, nitrate, chloride, alkoxide, oxide and carbonate.

In addition, a starting material of Ba metal may be at least one salt selected from the group consisting of acetate, chloride, hydroxide octahydrate and nitrate.

Further, a starting material of B may be boric acid or trimethyl borate.

Four kinds of metal salts, except Si among the five elements, are used as starting materials to be dissolved in a solvent. At this time, the solvent may be at least one selected from the group consisting of distilled water, acidic solvents, and alcohols. The acidic solvents, and may be selectively added, functions to accelerate solubility of the metal.

Further, the alcohols function to accelerate a polycondensation reaction, and specifically, may include a hydrocarbon solvent having a carbon number of 1 to 4 selected from the group consisting of ethanol, methanol, isopropanol, and 1-butanol.

The reason for using various solvents as solvents of the starting materials of the four kinds of metals is that the metals are dissolved by different solvents. The solvents may be previously mixed before use, and the solvents may be sequentially input, but the sequence is not limited thereto.

However, when the solvents are mixed, distilled water: acidic solvent: alcohols are mixed at a volume ratio of 0.7:0.0:0.5~1.3:0.2:1.3, preferably, 0.9:0.1:1.0~1.0:0.2:1.2. When the mixing ratio of the solvents is deviated from the range, since the starting materials of the metals may not be completely dissolved and then precipitated, it is not preferable.

The next step is additionally inputting a silicon starting material into a solution in which starting materials of the four metals are dissolved and reacting them with each other. The starting material of Si used at this time is not limited but may be tetraethyl orthosilicate (TEOS). When the Si starting material is added and reacted for about 1 to 2 hours, a transparent (stock solution) is generated.

Next, a solution having an adjusted pH is manufactured in a separate vessel. In the present invention, when the glass powder is manufactured through liquid phase deposition, pH of the solution is appropriately adjusted to manufacture a nano size of powder. The pH adjustment solution may include an alcohol-based solvent and a basic catalyst. Here, the basic catalyst is added to adjust the pH of the solution. When the basic catalyst is not added, the pH of the solution shows acidity. In this case, particles may be condensed to cause a bad effect. In addition, since the pH may be excessively increased when only the basic catalyst is used, the alcohol-based solvent may be mixed therewith.

The alcohol-based solvent may include a hydrocarbon solvent having a carbon number of 1 to 4 selected from the group consisting of ethanol, methanol, isopropanol, and 1-butanol.

In addition, the basic catalyst is not limited but may be at least one selected from ammonia and urea, most preferably, ammonia.

A mixing ratio of the alcohol-based solvent and the basic catalyst is 10:1 to 1:1 in a volume ratio, which is preferable to maintain an appropriate pH.

The solution may be adjusted to a pH of 3 or more, preferably, 7 to 13 to appropriately manufacture a nano size of glass powder.

Next, the stock solution in which the starting materials are mixed and reacted is added into the pH-adjusted solution to manufacture a mixed solution. The important thing in this step is that the stock solution must be added into the pH-adjusted solution. That is, the glass powder having a uniform particle size can be manufactured as long as conditions of maintaining a uniform pH are continuously maintained. If the pH-adjusted solution is mixed with the stock solution with which the starting materials are mixed, since the pH of the mixed solution is varied, the particle size may be non-uniformized.

Precipitates are generated in the mixed solution. When the precipitates are filtered, dried and heat-treated, a nano size of glass powder can be obtained.

The filtering, drying and heat treatment process may be processed according to a conventional method of manufacturing a glass powder, and the method is not particularly limited thereto.

The glass powder manufactured through the series of processes may have a particle size of 100nm or less, preferably, 10 to 100nm, in which the particle size distribution is uniform.

Therefore, the nano size of glass powder in accordance with the present invention may be used as low-temperature sintering additives upon manufacture of a multi-layered ceramic material such as a multi-layered ceramic capacitor (MLCC) and a multi-layered ceramic inductor (MLCI), which can be plasticized at a low temperature.

The glass powder in accordance with the present invention can be plasticized at a low temperature of 1100 to 1200° C.

Hereinafter, a process of manufacturing spheres of nano glass in accordance with the present invention will be described in detail. Embodiments of the present invention are provided to those skilled in the art to more completely describe the invention. The following embodiment is not limited but may be modified in various shapes. That is, the following embodiment is provided to more faithfully or completely described and completely serve the spirit of the present invention to those skilled in the art.

First Embodiment

Figure 2:
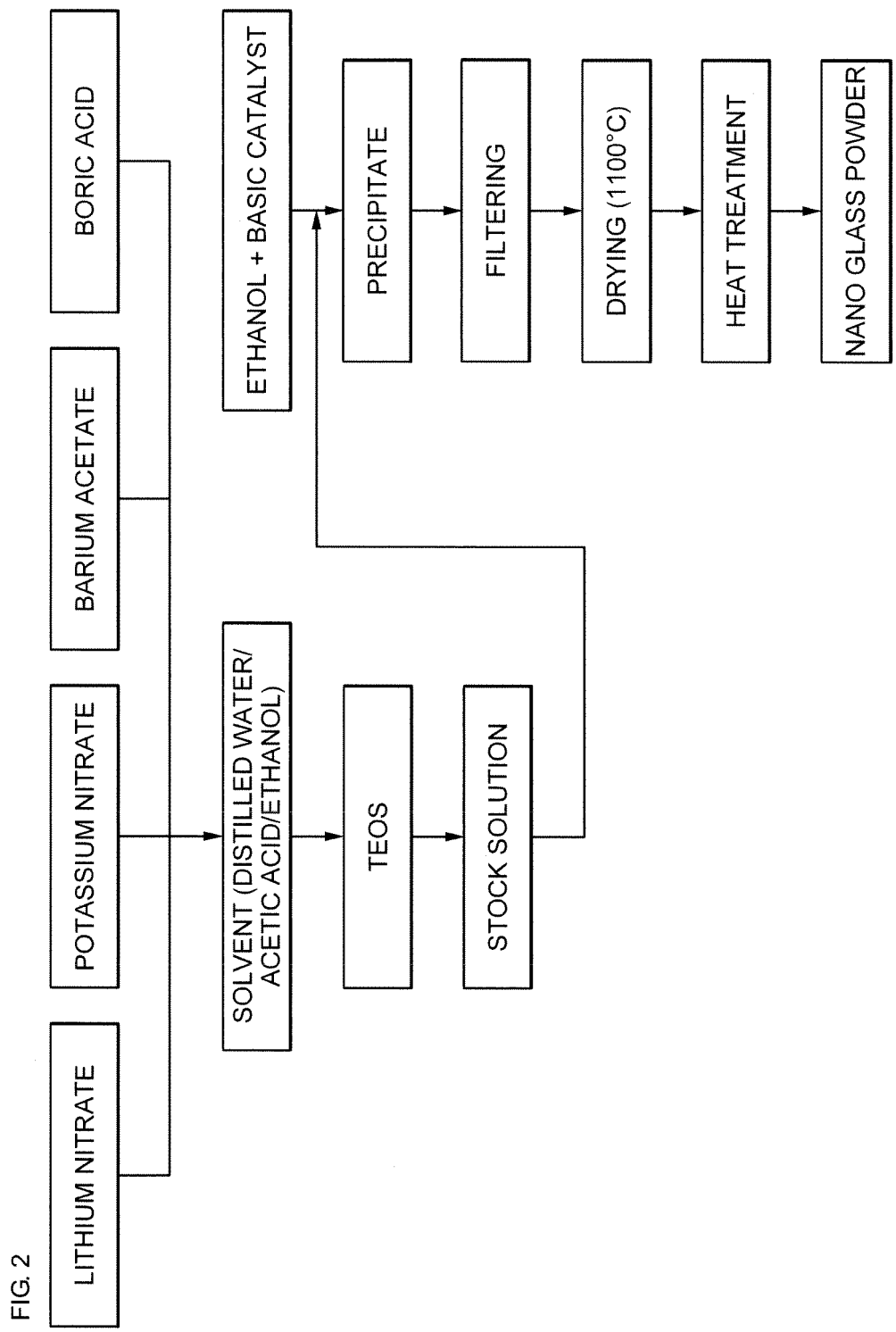
FIG. 2 is a flowchart showing a process of manufacturing a glass powder using liquid phase deposition of the present invention.

Hereinafter, a glass powder was manufactured according to manufacturing processes shown in FIG. 2.

An input amount of starting materials was determined with reference to a solvent of 0.5 mol and 2L, and starting materials of Li, K and Ba and a starting material of B were prepared. The starting material of Li was lithium nitrate, the starting material of K was potassium nitrate, the starting material of Ba was barium acetate, and the starting material of B was boric acid.

In addition, a starting material of Si was prepared as tetraethyl orthosilicate (TEOS), and the starting materials were weighted to satisfy composition of the glass powder, which is to be manufactured in the present invention.

Among the starting materials of the prepared Li, K, Ba, B and Si, the starting materials of Li, K, Ba and B were first dissolved in distilled water (900ml). Here, acetic acid (100ml) was added. As the acetic acid was added, dissolution of Li, K, Ba and B were accelerated. In addition, ethanol (1000ml) was added to accelerate a polycondensation reaction.

After TEOS, which is the previously prepared starting material of Si, was added to the mixed solution, and then, mixed for about one hour to manufacture a clear solution (stock solution).

In addition, ethanol 200ml and ammonia 50ml as a basic catalyst were mixed in another separate vessel to prepare a mixed solvent having a pH of 10. The prepared stock solution was added to the prepared mixed solvent. At this time, when the solution was poured, precipitates were generated. The precipitated solution was filtered and dried at a temperature of 200° C. or less to obtain a powder. Here, since the obtained powder contains organic materials, the powder was heat-treated at a temperature of 600° C. or less to obtain desired nano glass.

The resultant glass powder has composition represented as $0.08Li_2O$-$0.04K_2O$-$0.1BaO$-$0.18B_2O_3$-$0.60SiO_2$, and all average particle sizes were 100 nm or less.

FIRST TEST EXAMPLE

Figure 3:
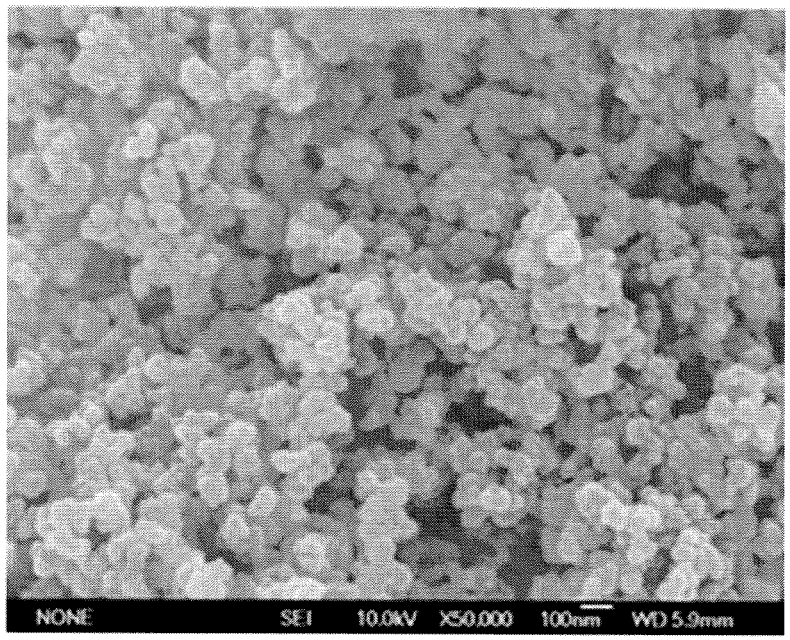
FIGS. 3 and 4 are SEM measurement photographs of a glass powder in accordance with an exemplary embodiment of the present invention.
Figure 4:
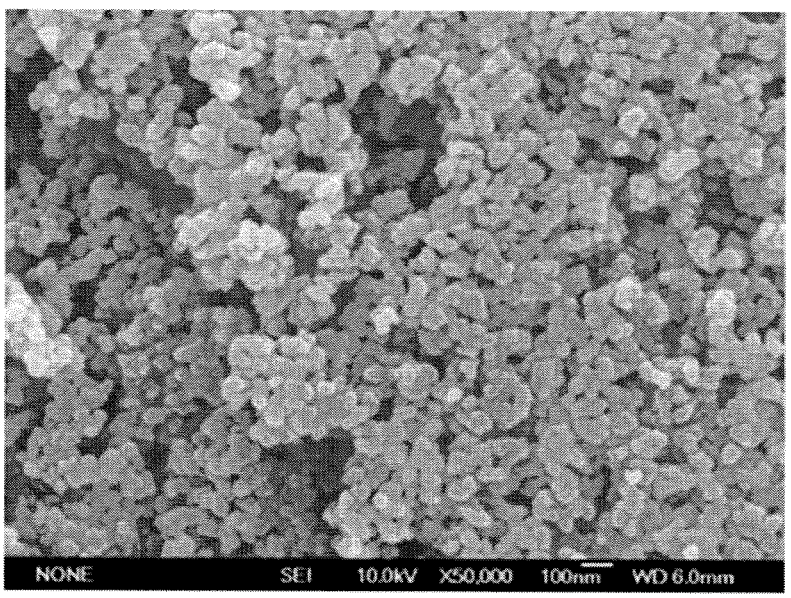

A particle shape of the glass powder manufactured according to the embodiment was measured by a scanning electron microscope (SEM), and results were shown in FIGS. 3 and 4.

As shown in FIGS. 3 and 4, it will be appreciated that the glass powder manufactured according to the present invention has very uniform particle size distribution and the particle size is 100nm or less.

The glass powder having the uniform particle size distribution and nano size of particle size can be used as sintering additives to effectively decrease a sintering temperature upon manufacture of a ceramic material such as MLCC and MLCI, which can be sintered at a low temperature.

As can be seen from the foregoing, according to the present invention, the nano glass powder having an average particle size of 100nm or less and uniform particle size distribution can be manufactured using liquid phase deposition, specifically, a sol-gel method.

In addition, the glass powder can be used as sintering additives to decrease a sintering temperature by about 100° C. in comparison with the conventional glass upon manufacture of a ceramic material such as MLCC and MLCI, which can be sintered at a low temperature, contributing to improvement of dielectric capacity and inductance capacity of the parts and increasing quality coefficient.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A glass powder represented as the following Formula 1:

$$a\text{Li}_2\text{O}\text{-}b\text{K}_2\text{O}\text{-}c\text{BaO}\text{-}d\text{B}_2\text{O}_3\text{-}e\text{SiO}_2 \qquad \text{Formula 1}$$

wherein a+b+c+d+e=1, and 0.01≤a≤0.1, 0.01≤b≤0.1, 0.01≤c≤0.1, 0.05≤d≤0.3, and 0.3≤e≤0.7 are satisfied in terms of mol %, and wherein the glass powder has a particle size of 10 to 100 nm.

* * * * *